United States Patent
Sousa et al.

(10) Patent No.: US 7,054,301 B1
(45) Date of Patent: May 30, 2006

(54) COORDINATED HOPPING IN WIRELESS NETWORKS USING ADAPTIVE ANTENNA ARRAYS

(75) Inventors: Elvino S. Sousa, Toronto (CA); Athanasios A. Kasapi, San Francisco, CA (US); Mitchell D. Trott, Mountain View, CA (US)

(73) Assignee: ArrayComm, LLC., San Jose, CA (US)

( * ) Notice: Subject to any disclaimer, the term of this patent is extended or adjusted under 35 U.S.C. 154(b) by 949 days.

(21) Appl. No.: 10/037,362

(22) Filed: Dec. 31, 2001

(51) Int. Cl.
*H04J 13/06* (2006.01)

(52) U.S. Cl. .................. 370/343; 370/437; 375/134
(58) Field of Classification Search ............... 370/343, 370/437; 375/132, 134
See application file for complete search history.

(56) References Cited

U.S. PATENT DOCUMENTS

| | | | |
|---|---|---|---|
| 6,370,128 B1 * | 4/2002 | Raitola | 370/329 |
| 6,920,192 B1 * | 7/2005 | Laroia et al. | 375/347 |
| 6,931,030 B1 * | 8/2005 | Dogan | 370/509 |
| 2004/0063450 A1 * | 4/2004 | Uhlik | 455/517 |
| 2004/0063465 A1 * | 4/2004 | Uhlik | 455/561 |
| 2004/0205105 A1 * | 10/2004 | Larsson et al. | 709/200 |

\* cited by examiner

*Primary Examiner*—Melvin Marcelo
(74) *Attorney, Agent, or Firm*—Blakely, Sokoloff, Taylor & Zafman LLP

(57) ABSTRACT

The present invention allows many of the benefits of spatial diversity to be realized in a hopping radio communications system. One embodiment of the invention includes transmitting signals from a first radio using a first hopping sequence and transmitting signals from a second radio using spatial processing and a second hopping sequence. The second hopping sequence is coordinated with the first hopping sequence. In another embodiment, the invention includes selecting a set of spatial processing parameters based, at least in part, on a determination whether a third radio using a first frequency resource during a first time interval uses a second frequency resource during a second time interval and transmitting a signal from a first radio to a second radio during the second time interval using the second frequency resource and the selected set of spatial processing parameters.

69 Claims, 6 Drawing Sheets

COORDINATED HOPPING IN WIRELESS NETWORKS USING ADAPTIVE ANTENNA ARRAYS

BACKGROUND OF THE INVENTION

1. Field of the Invention

The present invention applies to the field of wireless communications systems using adaptive antenna arrays and, in particular, to coordinating hopping frequency or channel sequences in a wireless communication system with adaptive antenna arrays.

2. Description of the Prior Art

Mobile radio communications systems such as cellular voice and data radio systems typically have several base stations in different locations available for use by mobile or fixed user terminals, such as cellular telephones or wireless web devices. Each base station typically is assigned a set of frequencies or channels to use for communications with the user terminals. The frequencies are different from those of neighboring base stations in order to avoid interference between neighboring base stations. As a result, the user terminals can distinguish the transmissions received from one base station from the signals received from another.

Each base station is assigned a set of frequency resources to organize into traffic and overhead channels. In a typical wireless network, a traffic channel can consist of a time slot in a frame on a carrier frequency. A TDMA (Time Division Multiple Access) frame may contain, for example, eight downlink transmit time slots followed by eight uplink receive time slots. A carrier frequency may be a 200 kHz band around a central frequency, such as 800 MHz or 1.9 GHz. This band represents a frequency resource used by the base station and its user terminals for communication. Thus, a base station transmits to a given user terminal, for example, on the second transmit and receive time slots on this frequency in a given frame. Furthermore, the communications channel may be organized using common techniques, such as FDD (Frequency Division Duplex), TDD (Time Division Duplex), FDMA (Frequency Division Multiple Access), and CDMA (Code Division Multiple Access), as described further below.

Other user terminals within or beyond the same radio communications system may also be using this same physical channel. These user terminals can be called co-spatial users in a SDMA (Spatial Division Multiple Access) system, because only spatial characteristics distinguish terminals that share the same physical channel. These users are also sometimes referred to as cochannel users or interferers.

The allocation of frequency resources to traffic and overhead channels can be augmented by a hopping function. In a network using frequency hopping, each base station changes the frequency used to communicate with any one user terminal periodically. That is, a base station transmitting to a user terminal using one frequency at one time will use a different frequency at another time. The frequencies are typically selected only from among those allocated to that base station. In a TDMA system, the frequency hop may take place between frames, or may be more frequent, such as every TDMA time slot, or less frequent, such as every fifth frame.

Frequency hopping is often used to counter fading and radio frequency (RF) interference. Fading due to multi-path propagation in the RF environment is generally frequency dependent, with different channels experiencing different levels of fading. Frequency hopping can average the fading for many user terminals, so that no one terminal suffers severe fading. Frequency hopping can also serve to average interference among user terminals, since with each hop, each user terminal faces a different set of interferers of various intensities. Thus, in the long run, each user terminal experiences similar levels of interference, and no user terminal experiences severe interference.

Different wireless air interface standards and protocols incorporate or accommodate frequency hopping in order to enhance the capacity of the network and the quality of the reception for the users. One such standard is GSM (Global System for Mobile Communication), a standard of digital cellular TDMA telephony using base stations and mobile remote terminals. These remote terminals may be cellular phones, mobile data devices, or any other mobile receiver or transceiver.

In GSM, hopping patterns have generally been designed so that hopping functions used by different user terminals in the same cell are orthogonal to reduce interference. That is, the hopping functions are designed so that they result in hopping sequences where user terminals in the same cell never use the same channel at the same time. A cell may correspond to a specific geographic area serviced by one or more antennas, or a cell can include the user terminals serviced by a base station at a given time. Adjacent cells are generally allocated different frequency resources to keep interference minimal. In theory, hopping sequences in adjacent cells have little or no impact on each other. Cells allocated the same or overlapping frequency resources generally use differing hopping sequences, to further randomize the interferers.

Adaptive antenna arrays enable a wireless system to use SDMA (Spatial Division Multiple Access) methods to reduce interference and enhance system capacity. These methods include 1) increasing the signal to interference ratio on the uplink by adjusting received signal samples based on the location of a remote terminal and the RF environment, 2) concentrating signal power to the intended user terminal (beam-forming), and 3) placing nulls to user terminals using similar or the same frequency resources, such as terminals using the same channel (null-placing) on the downlink (base station to user terminal). Thereby, adaptive arrays can greatly enhance the capacity of a wireless system. Beam-forming and null-placing are sometimes described directionally, for example, as placing a null in the direction of a user terminal. However, null-placing can involve using multiple waveforms in such a way that they destructively interfere at certain spatial locations due to the RF environment. Furthermore, nulling or null-placing may not eliminate all interference experienced by co-spatial users. Null-placing may only attempt to reduce interference based on information about the RF environment and the RF characteristics or parameters of co-spatial user terminals.

Frequency hopping can reduce the gains achieved using SDMA methods. The rapid change of interferers—interferer diversity—caused by frequency hopping can make it difficult or impossible to execute a spatial processing strategy. Previously determined spatial processing parameters and spatial processing weights may not apply after a hop. The problem becomes more difficult in systems in which downlink signals occur immediately after a hop and before an uplink signal has been received.

BRIEF SUMMARY OF THE INVENTION

The present invention allows many of the benefits of spatial diversity to be realized in a hopping radio communications system. One embodiment of the invention includes receiving an uplink signal from a first remote user terminal on a first carrier frequency at a first wireless communications base station together with ambient noise and interfering signals from at least one other remote user terminal on the first carrier frequency, the first carrier frequency being determined using a first hopping sequence used for communication with the first remote user terminal and determining a set of receive spatial processing parameters for the first remote user terminal and the first carrier frequency using the received uplink signal, the received noise and the received interfering signals. The embodiment further includes determining a second carrier frequency for use in communication with the first remote user terminal at a second time using the first hopping sequence, comparing the second carrier frequency to a predicted carrier frequency that will be used by the at least one other remote user terminal at the second time and transmitting a downlink signal from the first base station to the first remote user terminal at the second time on the second carrier frequency using a set of transmit spatial processing parameters, the set of transmit spatial parameters being based on the set of receive spatial processing parameters if the second carrier frequency and the predicted carrier frequency are interfering carrier frequencies.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Base Station Structure

Figure 1:
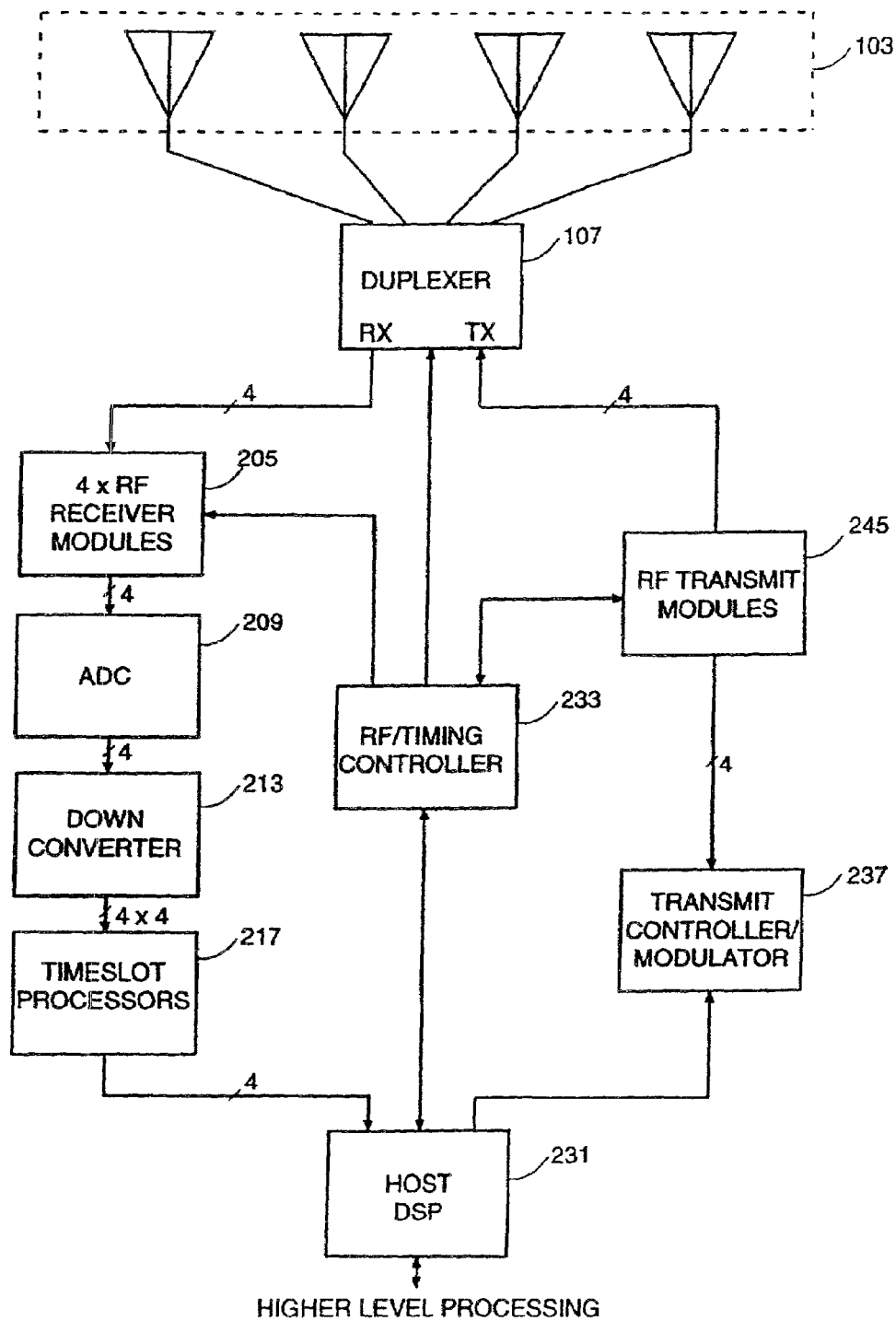
FIG. 1 is a simplified block diagram of a base station on which an embodiment of the invention can be implemented.

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 1 shows an example of a base station of a wireless communications system or network suitable for implementing the present invention. The system or network includes a number of subscriber stations, also referred to as remote terminals or user terminals, such as that shown in FIG. 2. The base station may be connected to a wide area network (WAN) through its host DSP 231 for providing any required data services and connections external to the immediate wireless system. To support spatial diversity, a plurality of antennas 103 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 231 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 107, which in a TDD embodiment, may be a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are converted down in analog by RF receiver ("RX") modules 205 from the carrier frequency to an FM intermediate frequency ("IF"). This signal then is digitized (sampled) by analog to digital converters ("ADCs") 209. Final down-converting to baseband is carried out digitally. Digital filters can be used to implement the down-converting and the digital filtering, the latter using finite impulse response (FIR) filtering techniques. This is shown as block 213. The invention can be adapted to suit a wide variety of RF and IF carrier frequencies and bands.

There are, in the present example, eight down-converted outputs from each antenna's digital filter device 213, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) device 217 (hereinafter "timeslot processor") for further processing, including calibration, according to one aspect of this invention. Eight Motorola DSP56300 Family DSPs can be used as timeslot processors, one per receive timeslot. The timeslot processors 217 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 217 is demodulated burst data for each of the eight receive timeslots. This data is sent to the host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56300 Family DSP. In addition, timeslot processors send the determined receive weights for each user terminal to the host DSP 231. The host DSP 231 maintains state and timing information, receives uplink burst data from the timeslot processors 217, and programs the timeslot processors 217. In addition it decrypts, descrambles, checks error correcting code, and deconstructs bursts of the uplink signals, then formats the uplink signals to be sent for higher level processing in other parts of the base station. Furthermore DSP 231 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 237. The host DSP also manages programming of other components of the base station including the transmit controller/modulator 237 and the RF timing controller shown as 233.

The RF timing controller 233 interfaces with the RF system, shown as block 245 and also produces a number of timing signals that are used by both the RF system and the modem. The RF controller 233 reads and transmits power monitoring and control values, controls the duplexer 107 and receives timing parameters and other settings for each burst from the host DSP 231.

The transmit controller/modulator 237, receives transmit data from the host DSP 231. The transmit controller uses this data to produce analog IF outputs which are sent to the RF transmitter (TX) modules 245. Specifically, the received data bits are converted into a complex modulated signal, up-converted to an IF frequency, sampled, multiplied by transmit weights obtained from host DSP 231, and converted via digital to analog converters ("DACs") which are part of transmit controller/modulator 237 to analog transmit waveforms. The analog waveforms are sent to the transmit modules 245. The transmit modules 245 up-convert the signals to the transmission frequency and amplify the signals. The amplified transmission signal outputs are sent to antennas 103 via the duplexer/time switch 107.

User Terminal Structure

Figure 2:
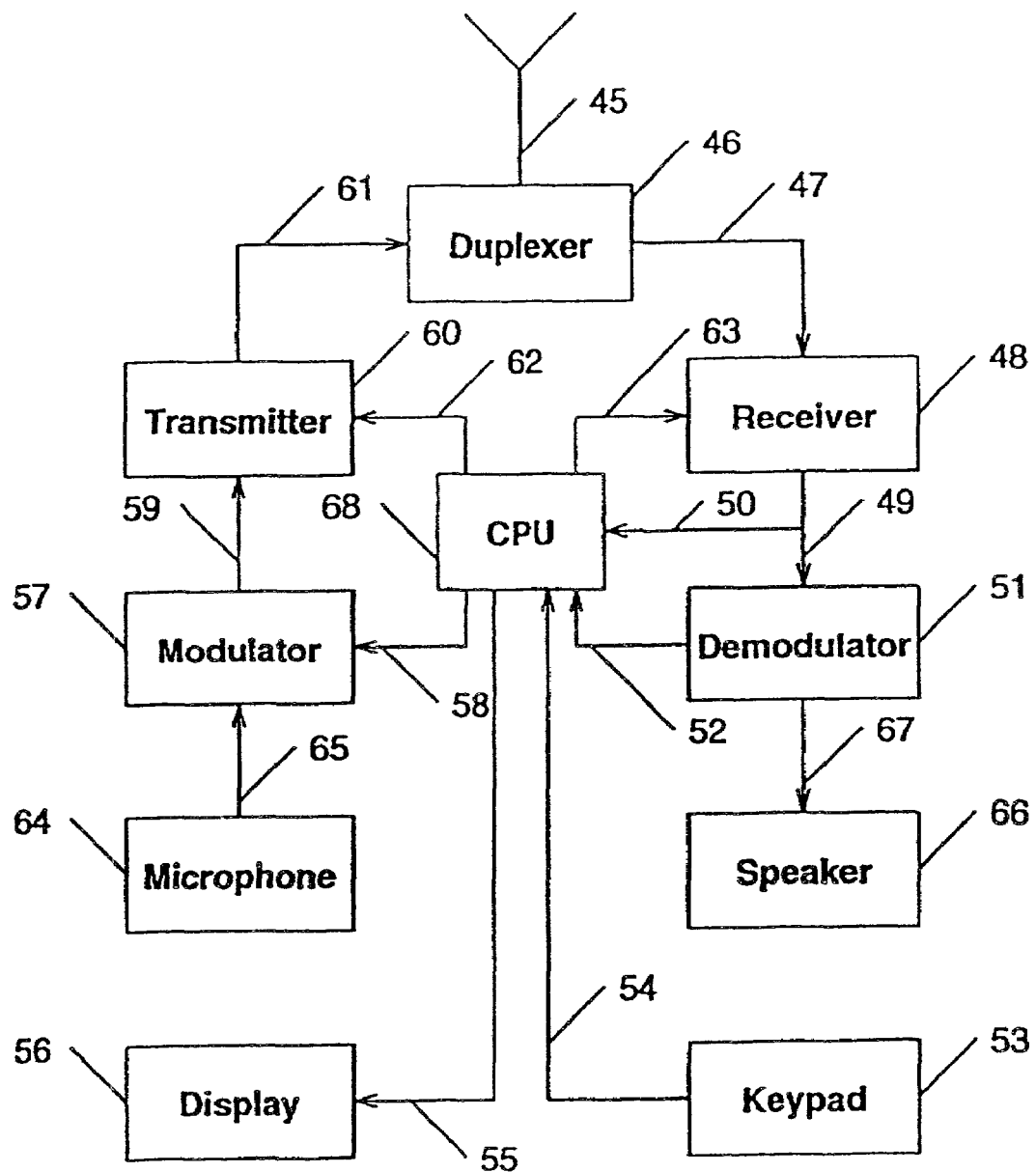
FIG. 2 is a simplified block diagram of a remote terminal on which an embodiment of the invention can be implemented.

FIG. 2 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

Frequency Hopping

In a wireless communications system that uses base stations and remote user terminals, frequency hopping is often controlled by the base station, though the user terminals also have complete information about the hopping function to enable them to hop with the base station. Generally, information about the hopping function to use is exchanged on call setup or user terminal registration, that is, the base station dictates to the user terminal which hopping function it should use. Hopping functions can be fixed and predetermined on manufacture, or freely programmable and storable on base station and user terminal dynamic memory.

In a wireless communications system, a base station may interfere with user terminals that communicate with another base station using the same or different channels. The same user terminals can also interfere with the signals received at the base station from other remotes. Interfering user terminals may be communicating with the same base station, within the same cell or a different cell, or they may be communicating with a different base station. Interfering user terminals may also be users on another network using overlapping or neighboring frequency resources. The benefits of SDMA are enhanced if interferers are stable and can be accounted for. Then, the base station can more accurately mitigate interference for co-spatial users, i.e. place nulls in the direction of the interferers, and ignore signals received from them.

In some air interface protocols, such as GSM, a downlink signal is sent from the base station to a particular remote on an assigned slot of a TDMA frame. This downlink signal precedes an uplink signal from the remote back to the base station that is sent within the same frame. The channel then hops to another frequency at the beginning of the next frame. As a result, the downlink is the first signal to be sent after each frequency hop. On the uplink signal from the remote, or a signal from an omni-directional transmitter from a spatial diversity receiver, the base station or spatial diversity receiver may not need to have prior information about the spatial characteristics of potential co-spatial interferers or of the user terminal's spatial characteristics and radio channel quality. The information may be adequately determined from a training sequence, or other information. Historical information, i.e. information collected during an earlier frame, can also be used to improve reception. Typically it is preferred to use historical information that is as recent as possible because the RF environment changes with time. Depending on various factors, including the mobility and speed of the user terminal, the RF environment may change very rapidly.

In contrast, on the downlink, or with a spatially directed signal, the base station can benefit from accurate information regarding the spatial characteristics and the channel characteristics of the receiver. This information can be collected during a previous uplink signal from the user terminal to which the base station is sending the downlink signal. This information, which in a GSM system would be from a previous frame, can include data about the spatial characteristics or parameters of a co-spatial user, such as various components of the RF environment and angles of arrival of signals received from these user terminals. The spatial characteristics for co-spatial users can be used by the base station to mitigate interference by placing nulls in the directions of the other users.

However, in a network using frequency hopping, a co-spatial user on a previous frame may not necessarily be co-spatial on the next frame, or the frame after that. In fact, hopping functions are generally designed to ensure a different set of co-spatial users with each hop. In GSM, for example, the hopping sequences are designed to differ with different base stations so that the interferers change with each hop. This makes it difficult for the base station to account for interferers in sending a downlink signal. If a base station sends a downlink signal based on information from a previous frame and if the interferers have changed with that hop, then the information on interferers will not be accurate. This can diminish the effectiveness of the spatial processing and make it more difficult to reduce interference in the system. If the downlink always comes before the uplink, then the base station cannot easily acquire information about the user terminal's channel before sending a downlink signal.

The function used to determine the next carrier is generally referred to as a hopping function, and the pattern of frequencies generated by the function is generally referred to as a hopping sequence, although the two terms are sometimes used interchangeably. While the present embodiments are described in terms of the more commonly used frequency hopping, the invention is also applicable to time slot hopping, in which user terminals change TDMA or TDD slots between frames. Most hopping functions whether for frequencies, time slots or both can be classified as either cyclic hopping sequences or pseudo-random hopping sequences. Cyclic hopping sequences cycle through all available carriers in some pattern, and repeat the same pattern over and over.

Pseudo-random hopping functions do not need to follow a repeating or organized pattern. Instead they use a seed and randomizer to generate a pseudo-randomized hopping sequence. Thus these sequences may use some carriers more often than others. In an ideally randomized sequence, the present carrier should have no effect on the next carrier after the hop. Pseudo-random sequences are generally used instead of truly random sequences to allow the user terminals to follow the hopping of the base station. Pseudo-random sequences can be recreated from a seed and a randomizer algorithm, as is well known in the art.

Figure 3:
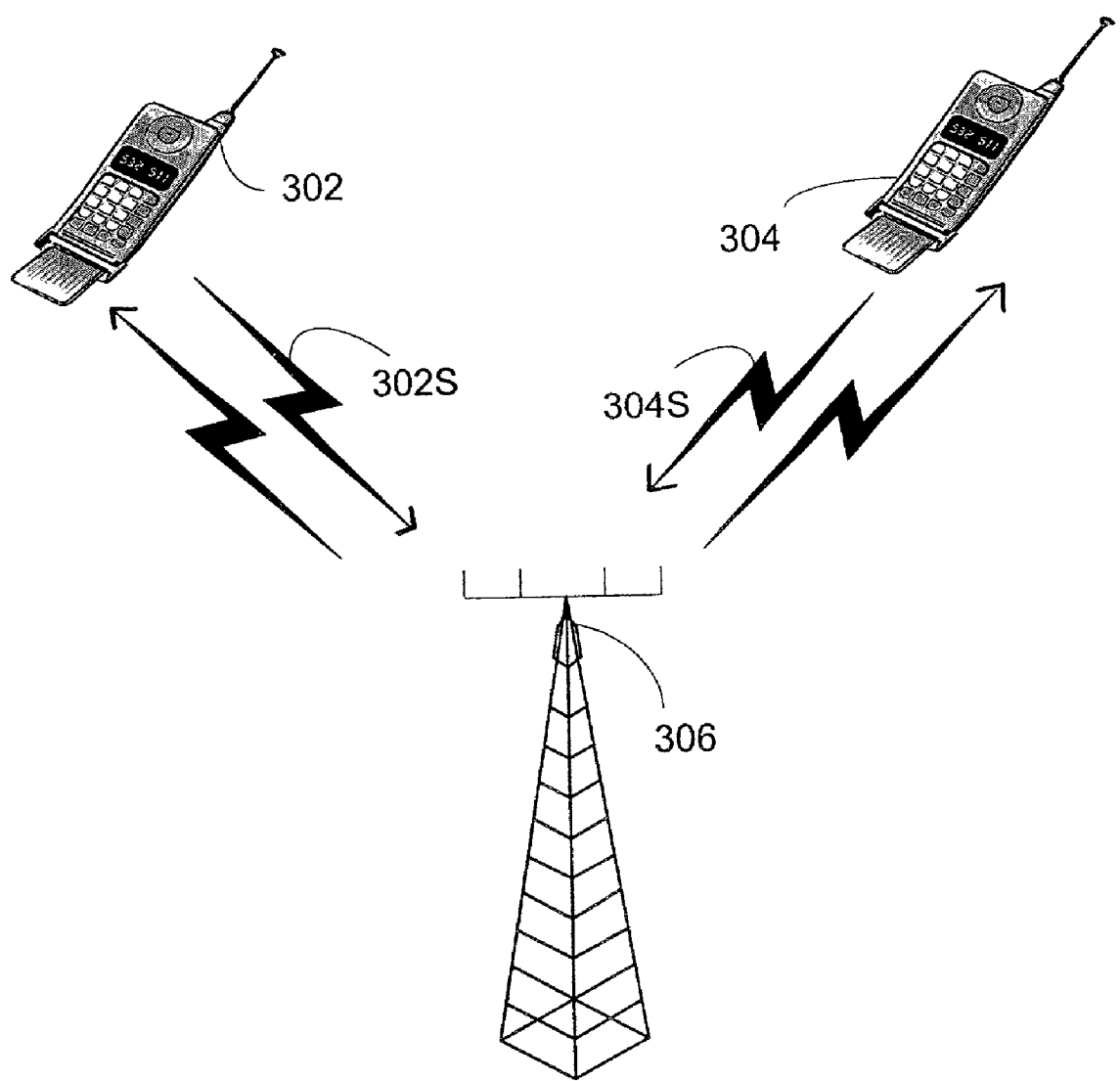
FIG. 3 is a diagram of a wireless communications system on which an embodiment of the present invention can be implemented.

FIG. 3 is a diagram of a wireless communications system in which two co-spatial users communicate with the same base station. A first user terminal 302 is using the same channel as a second user terminal 304 for communication with the base station 306. That is, the base station 306 cannot separate an uplink signal 302S from the first user terminal from an uplink signal 304S from the second user terminal by time or frequency because they arrive simultaneously on the same carrier. The base station 306 can perform some spatial processing approach, such as applying spatial processing weights, spatial signatures or some other SDMA methods to the received signals, as discussed above, to distinguish them. On the downlink, the base station can also use a spatial processing strategy to direct downlink signals intended for the first user terminal to only the first user terminal and to do likewise for the second user terminal.

For both the uplink and the downlink, or in other words for transmission and reception, the base station can use information about the spatial characteristics of both user terminals. This is particularly useful for the computation of downlink spatial processing weights. By ensuring that the two co-spatial user terminals stay co-spatial from hop to hop, i.e. stay on the same frequency and timing, historical spatial characteristics can be used effectively even if the channel has hopped. This allows SDMA approaches to be applied more effectively.

Figure 4:
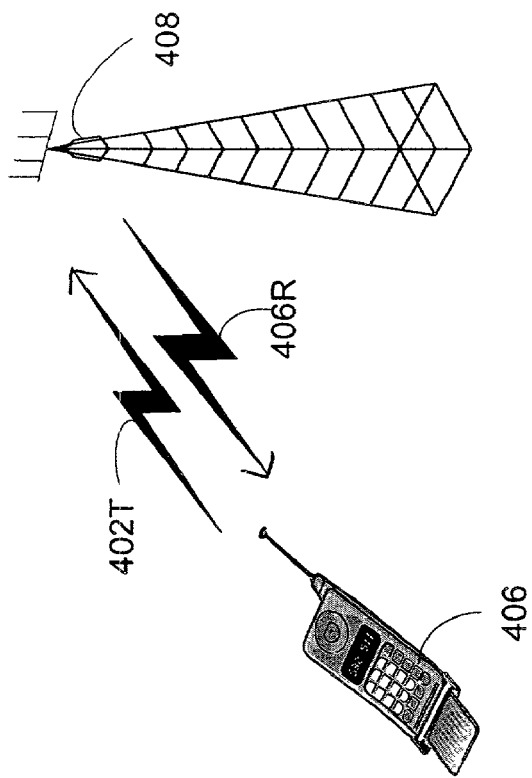
FIG. 4 is a diagram of an alternative wireless communications system on which an embodiment of the present invention can be implemented.
Figure 4:
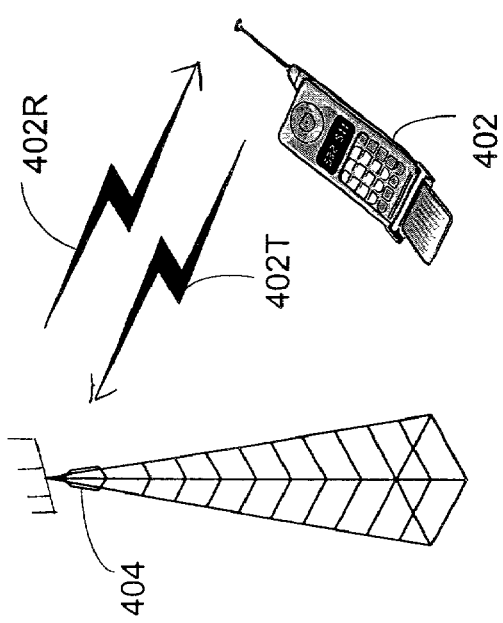

FIG. 4 is a diagram of a communications system in which co-spatial users are communicating with different base stations. The co-spatial users can still create interference for each other and spatial processing can enhance the usefulness of the system. A first user terminal 402 receives downlink signals 402R from a first base station 404 on the same downlink channel on which a second user terminal 406 receives a downlink signal 406R from a second base station 408. The downlink signals are sent in the same time slot of the same frame. To enhance communication, the first base station 404 can use spatial transmit weights to focus the energy of the downlink signal 402R in the direction of the first user terminal 402 while reducing the energy directed at the second user terminal 406. This mitigates interference. It sends less energy into the radio environment and may reduce energy consumption at the first base station. These techniques are known as beam-forming and null-placing, as mentioned further above. Similarly, user terminals 402 and 406 use the same uplink channel. Thus, base station 404 may use receive spatial processing weights to extract a good quality signal 402T transmitted from user terminal 402 from the received signals including also signal 406T transmitted by user terminal 406. As discussed above, the spatial weights are calculated from certain spatial parameters. For the uplink, these parameters can be adequately estimated on the current frame, but for the downlink, parameters from previous frames may be necessary.

If the base stations 404 and 408 use different hopping functions or sequences, then after a hop, the co-channel user terminals 402 and 406 may no longer use the same channel or frequency resource at some later time. If the hopping is done between each frame, then the very next time the first base station 404 is to transmit to the first user terminal 402, the first user terminal 406 may no longer be using the same carrier as the second user terminal 402. As a result, the RF environment will have changed and the downlink spatial processing parameters used for the previous frame will not be optimized for the next frame. The prior downlink parameters may be worse than not using spatial processing at all.

However, if the second user terminal 406 hops to the same carrier as the first user terminal 402 with each frame, then some of the spatial processing parameters can be reused. For example, the base station can place nulls in the direction of the second user terminal 406 based on the earlier spatial characteristics from a previous frame. The spatial weights from a previous frame can also be used as a basis adjusted to accommodate changes in the carrier frequency and the RF environment since the last frame. While only two base stations and remotes are shown and discussed, the same principles apply regardless of the number of other user terminals and base stations in the network.

In one embodiment, the base station 404 can determine whether the interfering user terminal 406 hops to the same carrier as its own user terminal 402 before transmitting a downlink signal. This can be done without making any measurements of the frequencies used by the interfering user terminal 406 if the base stations 404 and 408 have coordinated hopping sequences. The coordination may be perfect, such that any two user terminals on the network that share a frequency resource in one frame share a frequency resource in every other frame because they use the same hopping function. This ensures that the same co-spatial user terminals stay co-spatial from one frame, or other hopping interval, to the next. Alternatively, the coordination may be less than perfect, but sufficiently close to justify the reuse of the original spatial processing parameters, because the null-placing efforts will often be effective. That is, the hopping functions could substantially overlap, or overlap to a sufficient degree, to where the first base station 404 would be justified in not calculating new spatial processing parameters for the co-spatial user terminal 406 for every hop. For example, hopping functions could be coordinated to hop together for a minimum number of hops, such as three, or to coincide at every certain number of hops, such as every five hops.

Coordinating the hopping functions or hopping sequences of the base stations of the network in the above embodiment may take place during manufacture, though more likely the hopping functions are flexible and software controlled. The base stations can then be configured when the system is installed so that the same or overlapping hopping functions are used. In some systems, it may be possible to configure the hopping sequence usage remotely using a remote data link to each of the base stations in the system. In addition to the hopping functions or sequences, the timing of the hops can be coordinated, so that co-spatial users hop at substantially the same time. With accurate timing, the hops can virtually be in lockstep. The timing synchronization can be done using a variety of different techniques, for example, the base stations can be synchronizing to a central controller or hub station. The hub can transmit a timing signal through an RF channel or a wireline. Alternatively, the base stations can include a receiver (not shown) for an external timing signal such as a commonly received satellite signal, for example, GPS (Global Positioning System).

In other embodiments, the first base station 404 can have additional information about the hopping functions used by the second base station 408 for the second user terminal 406. For example, the base station 404 could look up, or calculate, specific time intervals when the hopping function it uses for its first user terminal 402 overlaps with the hopping function that the second base station 408 uses for its second user terminal 406, i.e., the frames on which the second user terminal 406 will be a co-spatial user. Then, the first base station 404 can reuse the original spatial processing parameters to place nulls in the direction of the second user terminal 406 for these frames only. In a similar fashion, the first base station 404 can determine frames when specific other user terminals use the same frequency resources as its first user terminal 402 and determine other spatial processing weights to be used on signals transmitted or received on those other frames.

In yet other embodiments, the first base station 404 can use statistical analysis to determine possible hopping sequences for the second co-spatial user terminal 406 with only limited information about the hopping sequences used by that terminal and its second base station 408, or with no information at all. For example, if the second base station 408 is not in the same network as the first base station 404, then the first base station 404 is likely to have little information about the hopping sequences used by the second base station 408. In these embodiments, the first base station 404 can track frames on which it detects the interfering second user terminal 406 on the same channel as its own user terminal 402. Then, based on the pattern of interference, and possibly other information about typical hopping sequences, the first base station 404 can partially guess the hopping function used by interfering user terminal 406 and its base station in the other system.

Figure 5:
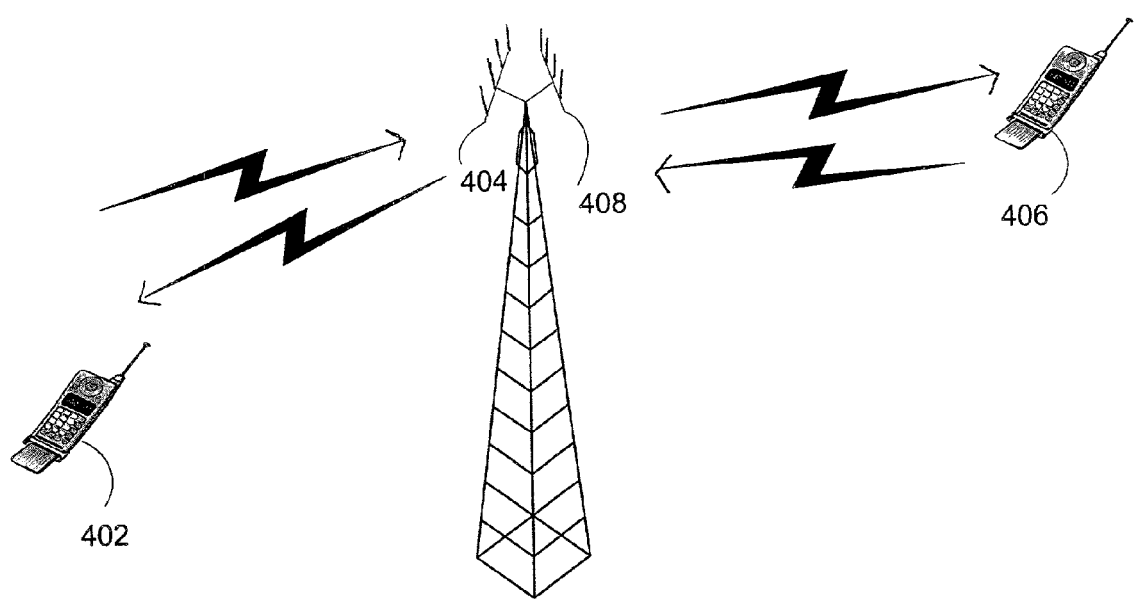
FIG. 5 is a diagram of another alternative wireless communications system on which an embodiment of the present invention can be implemented.

Alternate physical arrangements are also possible within the scope of the present invention. For example, FIG. 5 depicts a communications system in which two base stations 404 and 408 are co-located on one physical structure. Such an arrangement, for example, may correspond to base stations that each cover a sector of a cell in a cellular network. The two base stations are distinct in that they independently use different communications resources to communicate with different remote user terminals. On the other hand, the single physical structure is also sometimes referred to as a base station. As a result, the use of the term base station in the present description should not be restricted to a particular physical structure or particular site of antennas and RF communications equipment. The base stations of the present application may be separated or co-located. They may even share some hardware assets.

The hopping function coordination described above is a dramatic departure form other uses of hopping sequences. Typically, hopping functions are configured to result in interferer diversity, as described above. However, creating interferer diversity greatly complicates spatial processing performed by adaptive arrays, because the earlier spatial processing parameters can be rendered less accurate with each hop whether it is a hop in frequency or in time. If spatially directed signals are transmitted using spatial parameters from previous frames, it can be difficult or impossible to place nulls.

Figure 6:
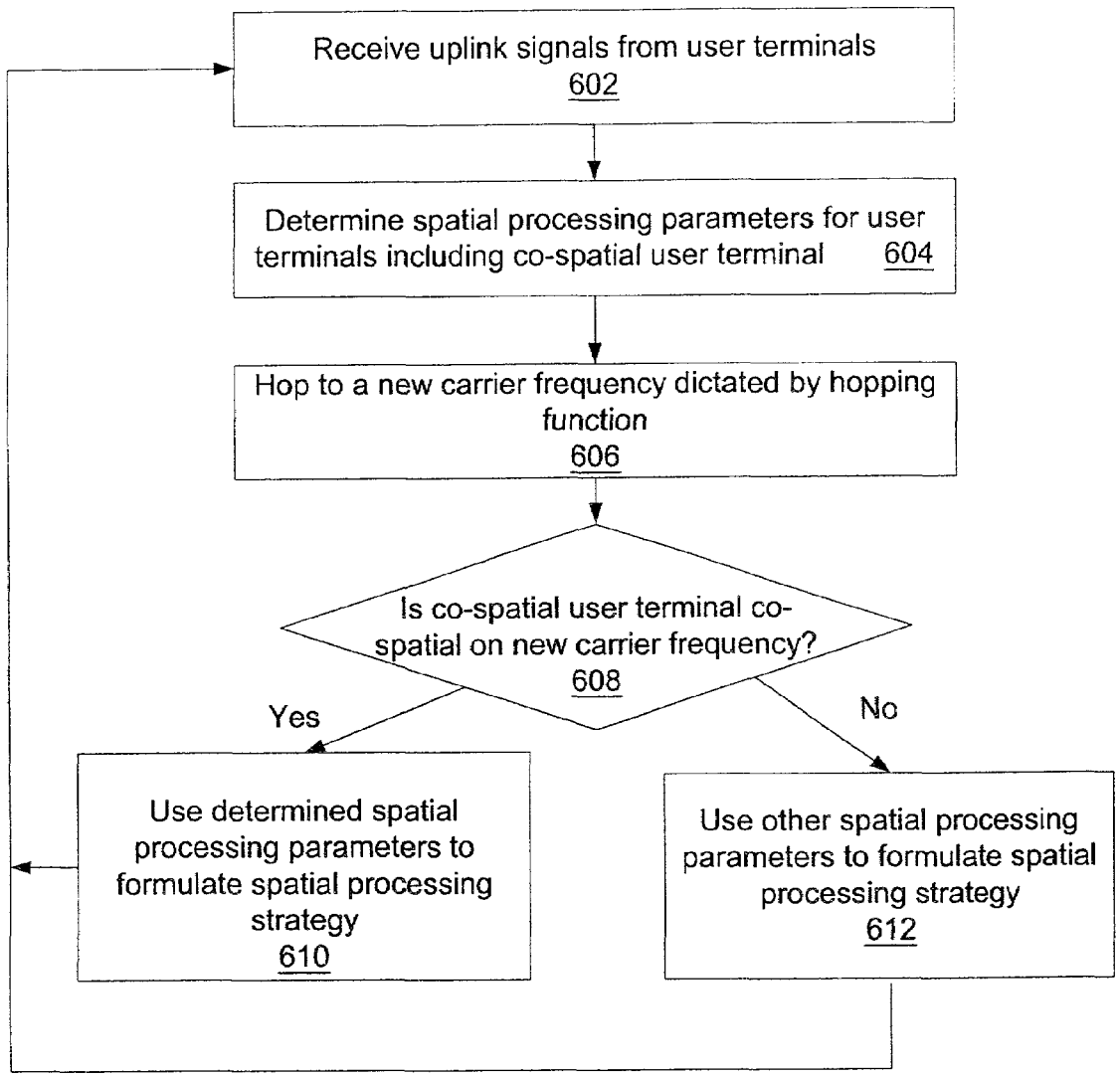
FIG. 6 is a simplified flow chart of a method of carrying out one embodiment of the invention.

FIG. 6 is a simplified flow diagram of one example of practicing the present invention. The method is explained as being performed by a base station, however, various parts of the method can be performed at other equipment in the network. Initially 602, the base station receives uplink signals from various user terminals. In a GSM system, the base station at this point is in the middle of a frame and has already transmitted downlink signals. The received signal is typically a combination of an uplink signal from a user terminal selected for communication and at least one other co-spatial user terminal. The combined signal is time and frequency filtered to substantially isolate the selected user terminal from the channel, The base station then uses spatial processing methods 604 to determine spatial processing parameters for the interfering user terminal. The spatial processing parameters, such as an angle or arrival or other RF characteristics associated with the co-spatial user terminal are used to implement a particular spatial processing strategy. One such strategy is calculating spatial processing weights that can actively mitigate the interference that a co-spatial user experiences on the downlink. Many other spatial processing strategies can also be applied using the spatial parameters.

After receiving the uplink signals, the base station executes a hop 606 following a particular hopping function or sequence. The hop can occur between frames or at any other defined time. The hop can be a change in frequency, a change in timing, a change in time slot within a frame or any other useful parameter of the traffic channel between the base station and the remote user terminal. In many hopping schemes all the traffic channels will hop at the same time in a correlated pattern. Often the carrier frequencies used for all the traffic channels will change at the same time. Other channels may also be affected. As a result, the channel that the base station uses to communicate with the selected user terminal changes, in some way.

The base station also determines 608 whether the co-spatial user terminal will also be a co-spatial user terminal when the next downlink signal is sent from the base station to the user terminal. In some cases, this will mean hopping to the same carrier frequency as the base station. In other instances it will mean changing time slots. In other instances the co-spatial user terminal may not hop but may use continuous or wide band channels that interfere with several steps of the base station's hopping sequence. This determination can be made by receiving signals from the co-spatial user and analyzing this behavior. A wide band or continuous user terminal can be compared to the hopping sequence to determine when overlaps occur. A hopping pattern can be analyzed to predict the nature of subsequent hops.

The determination can also be made by analyzing other data. For example, if all neighboring base stations use known hopping sequences, then a comparison of the hopping sequences can be used to determine if the same interferers will reappear. In one embodiment, the hopping sequences are configured so that all base stations hop at the same time and in the same way. As a result, the interferers at one frequency and time will be interferers at all other frequencies and times regardless of the number of hops. Interferers may appear and disappear due to call termination, new user registration etc, but will not appear and disappear as a result of hopping. In this embodiment, the determination is simply an assumption that the co-spatial user in one frame will remain in the next. Knowing the nature of the hopping functions used by the co-spatial user, the base station may not need to perform any calculations to determine whether the co-spatial user will also be co-spatial after the next hop. The determination can be done by looking up a hopping function stored in the base station or elsewhere on the network. Alternatively, the base station can perform various calculations with the stored data to determine whether the hopping sequences of the selected and co-spatial user terminals coincide.

Having determined whether the co-spatial user will be co-spatial with the selected user terminal after the next hop, the base station transmits the downlink signal. There are two possibilities. If the co-spatial from before the hop will be a co-spatial user after the hop, then the earlier spatial parameters can be used 610. In one embodiment, the base station uses the spatial parameters already calculated for the co-spatial user terminal using an uplink signal in the previous frame, before the hop, to formulate another spatial processing strategy. This can include active nulling in the direction of the co-spatial user. However, if the co-spatial user will not be co-spatial after the hop, then the base station does not reuse 612 the spatial parameters for the former co-spatial user terminal. Other aspects of the received uplink signal from the previous frame can still be used, however.

Spatial nulling will not typically be effective if the co-spatial user terminal is no longer in the same channel. Thus, there is no need for mitigating interference in that direction on the downlink transmission. Instead, the base station can use a different set of spatial processing parameters to formulate a different spatial processing strategy on the downlink. This strategy may or may not include active null-placing towards co-spatial user terminals. If the base station has no information about co-spatial users from prior frames, it can be difficult to accurately place nulls.

In one embodiment, however, the base station can keep track of other user terminals and their hopping sequences, the base station may have spatial processing parameters for a co-spatial user terminal from a different previous frame or a different traffic channel. This data can be used on a frame when the terminals are co-spatial. The base station can keep a database of spatial parameters for all or some interfering user terminals to facilitate this functionality. This database can be updated with or without the specific assistance of the user terminals. The database can include information on user terminals communicating with other base stations on the same wireless communications network and on other RF devices not associated with the network.

The method can return to the beginning 602 where the base station receives signals on the uplink. On the uplink, the base station can use a spatial processing strategy partially derived from spatial parameters for co-spatial users calculated on previous frames. However, the base station need not use these parameters, and can use other methods to calculate new parameters.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using frequency hopping and spatial processing. These devices may be cellular phones, PDA's, laptop computers, or any other wireless devices.

In portions of the description above, only the base station is described as performing spatial processing using an adaptive antenna array. However, the user terminals can also contain antenna arrays, and can also perform spatial processing both on receiving and transmitting (uplink and downlink) within the scope of the present invention. Furthermore, in portions of the description above, the invention is described in terms of determining whether certain downlink spatial parameters should be reused after a frequency hop to be used to execute a spatial processing strategy, such as calculating spatial processing weights. However, the present invention may also apply those reused spatial parameters for calculating uplink spatial weights, or other uplink spatial processing strategies.

In portions of the description above, the present invention is described in the context of a GSM wireless network. However the present invention is equally applicable to any other air interface or protocol using hopping sequences. Also, the hopping is often described above as taking place frame to frame. However any time interval may be used between hops. Ideally, the hops are time-synchronized across the network, and even across other networks. This synchronization may be achieved by various methods, including synchronizing to a satellite signal, such as a GPS signal. However, the present invention is also applicable in non-synchronized networks. Alternatively, the hops may be time-synchronized, but the hop intervals may vary in length from one user terminal to another, or even from one hop to another.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   receiving, at a first time, an uplink signal from a first remote user terminal on a first carrier frequency at a first wireless communications base station together with ambient noise and interfering signals from at least one other remote user terminal on the first carrier frequency, the first carrier frequency being determined using a first hopping sequence used for communication with the first remote user terminal;
   determining a set of receive spatial processing parameters for the first remote user terminal and the first carrier frequency using the received uplink signal, the received noise and the received interfering signals;
   determining a second carrier frequency for use in communication with the first remote user terminal at a second time using the first hopping sequence;
   comparing the second carrier frequency to a predicted carrier frequency that will be used by the at least one other remote user terminal at the second time; and
   transmitting a downlink signal from the first base station to the first remote user terminal at the second time on the second carrier frequency using a set of transmit spatial processing parameters, the set of transmit spatial parameters being based on the set of receive spatial processing parameters if the second carrier frequency and the predicted carrier frequency are interfering carrier frequencies.

2. The method of claim 1, wherein comparing comprises comparing the value of the first hopping sequence at the second time to the value of a second hopping sequence at the second time.

3. The method of claim 2, wherein comparing the values comprises looking up the second hopping sequence in a database on the first base station.

4. The method of claim 2, wherein comparing the values comprises looking up the second hopping sequence in a database on a central base station.

5. The method of claim 2, wherein comparing comprises listening to the at least one other remote user terminal to predict the second hopping sequence.

6. The method of claim 2, wherein the first hopping sequence and the second hopping sequence are the same and wherein the first remote user terminal and the at least one other remote user terminal apply the respective hopping sequences using a common timing signal.

7. The method of claim 1, wherein the first time comprises a first time slot of a first TDMA frame and the second time comprises a second time slot of a second TDMA frame.

8. The method of claim 1, wherein receiving an uplink signal precedes transmitting a downlink signal.

9. The method of claim 1, wherein the set of transmit spatial processing parameters are selected to place nulls directed at the at least one other remote user terminal.

10. A method comprising:
determining whether a third radio using a first frequency resource during a first time interval uses a second frequency resource during a second time interval;
selecting a set of spatial processing parameters based, at least in part, on the determination; and
transmitting a signal from a first radio to a second radio during the second time interval using the second frequency resource and the selected set of spatial processing parameters.

11. The method of claim 10, wherein selecting a set of spatial processing parameters comprises selecting a first set of spatial processing parameters if the third radio uses the second frequency resource during the second time interval, and selecting a second set of spatial processing parameters if the third radio does not use the second frequency resource during the second time interval.

12. The method of claim 11, further comprising:
receiving a signal at the first radio from the second radio during the first time interval using the first frequency resource; and
calculating the first set of spatial processing parameters based, at least in part, on the received signal, prior to selecting the set of spatial processing parameters.

13. The method of claim 12, further comprising receiving a second signal at the first radio from the third radio during the first time interval using the first frequency resource prior to calculating the first set of spatial processing parameters.

14. The method of claim 13, wherein calculating comprises calculating the first set of spatial processing parameters based, at least in part, on the second received signal.

15. The method of claim 13, further comprising a fourth radio in communication with the third radio and wherein the first and fourth radios are base stations and the second and third radios are remote user terminals in a wireless communications network.

16. The method of claim 10, wherein determining comprises ascertaining whether, during the second time interval, a frequency resource determined from a first hopping function used by the third radio coincides with a frequency resource determined from a second hopping function used by the first radio.

17. The method of claim 10, wherein the frequency resource used by the third radio in any time interval is controlled by a first hopping function, wherein the frequency resource used by the first radio to transmit to the second radio is controlled by a second hopping function and wherein determining comprises comparing the first and second hopping functions.

18. The method of claim 17, wherein selecting a set of spatial processing parameters comprises selecting a first set of spatial processing parameters if the first and second hopping functions are the same and selecting a selecting a second set of spatial processing parameters if the first and second hopping functions are different.

19. The method of claim 17, wherein comparing the first and second hopping functions comprises comparing the time synchronization of the first and second hopping functions.

20. The method of claim 10, wherein transmitting from the first radio using the first set of spatial processing parameters comprises mitigating interference transmitted to the third radio.

21. The method of claim 20, wherein transmitting from the first radio using the first set of spatial processing parameters comprises placing nulls in the direction of the third radio.

22. The method of claim 10, wherein the first and second frequency resources each comprise a combination of a physical carrier frequency and a time slot assignment in a time division air interface protocol.

23. The method of claim 22, wherein the air interface protocol comprises a protocol selected from the group consisting of a GSM protocol, a CDMA protocol, a digital cellular protocol, a WLL protocol, and a PHS protocol.

24. The method of claim 10, wherein the first time interval comprises a first time slot of a first TDMA frame and the second time interval comprises a second time slot of a second TDMA frame.

25. The method of claim 24, wherein the first TDMA frame immediately precedes the second TDMA frame.

26. The method of claim 10, further comprising receiving a second
signal at the first radio from the second radio using the selected set of spatial processing parameters.

27. A machine-readable medium having stored thereon data representing instructions, which if executed by the machine, cause the machine to perform operations comprising:
determining whether a third radio using a first frequency resource during a first time interval uses a second frequency resource during a second time interval;
selecting a set of spatial processing parameters based, at least in part, on the determination; and
transmitting a signal from a first radio to a second radio during the second time interval using the second frequency resource and the selected set of spatial processing parameters.

28. The medium of claim 27, wherein the instructions for selecting a set of spatial processing parameters comprise instructions causing the machine to perform operations comprising selecting a first set of spatial processing parameters if the third radio uses the second frequency resource during the second time interval, and selecting a second set of spatial processing parameters if the third radio does not use the second frequency resource during the second time interval.

29. The medium of claim 28, comprising further instructions, which if executed by the machine, cause the machine to perform further operations comprising:
receiving a signal at the first radio from the second radio during the first time interval using the first frequency resource; and
calculating the first set of spatial processing parameters based, at least in part, on the received first receive signal, prior to selecting the set of spatial processing parameters.

30. The medium of claim 29, wherein the instructions for calculating comprise further instructions causing the machine to perform operations comprising calculating the first set of spatial processing parameters based, at least in part, on the second receive signal.

31. The medium of claim 27, wherein the frequency resource used by the third radio in any time interval is controlled by a first hopping function, wherein the frequency resource used by the first radio to transmit to the second radio is controlled by a second hopping function and wherein the instructions for determining comprise further instructions causing the machine to perform operations comprising comparing the first and second hopping functions.

32. An apparatus comprising:
a processor to determine whether a third radio using a first frequency resource during a first time interval uses a second frequency resource during a second time interval and to select a set of spatial processing parameters based, at least in part, on the determination; and
a transmitter of a first radio to transmit a signal to a second radio during the second time interval using the second frequency resource and the selected set of spatial processing parameters.

33. The apparatus of claim 32, wherein the processor selects a set of spatial processing parameters by selecting a first set of spatial processing parameters if the third radio uses the second frequency resource during the second time interval, and selecting a second set of spatial processing parameters if the third radio does not use the second frequency resource during the second time interval.

34. The apparatus of claim 33, further comprising:
a receiver of the first radio to receive a signal from the second radio during the first time interval using the first frequency resource; and
wherein the processor calculates the first set of spatial processing parameters based, at least in part, on the received first receive signal, prior to selecting the set of spatial processing parameters.

35. The apparatus of claim 34, wherein the receiver further receives a second signal at the first radio from the third radio during the first time interval using the first frequency resource prior to the processor calculating the first set of spatial processing parameters.

36. The apparatus of claim 35, wherein the processor calculates the first set of spatial processing parameters based, at least in part, on the second receive signal.

37. The apparatus of claim 35, further comprising a fourth radio in communication with the third radio and wherein the first and fourth radios are base stations and the second and third radios are remote user terminals in a wireless communications network.

38. The apparatus of claim 32, wherein the transmitter comprises a spatial division antenna array to mitigate interference transmitted to the third radio using the first set of spatial processing parameters.

39. A method comprising:
transmitting signals from a first radio using a first hopping sequence; and
transmitting signals from a second radio using spatial processing and a second hopping sequence, the second hopping sequence being coordinated with the first hopping sequence.

40. The method of claim 39, wherein the first hopping sequence is the same as the second hopping sequence through at least 3 consecutive hops.

41. The method of claim 39, wherein the first hopping sequence is the same as the second hopping sequence.

42. The method of claim 39, wherein the first and second radios comprise first and second base stations in a wireless communications network, at least a portion of the signals transmitted from the first base station interfering with at least a portion of the signals transmitted from the second base station.

43. The method of claim 42, wherein the wireless communications network is a cellular network and wherein the first and second base stations are in adjacent cells.

44. The method of claim 39, wherein the transmitted signals conform to an air interface protocol selected from the group consisting of a GSM protocol, a CDMA protocol, a digital cellular protocol, a WLL protocol, and a PHS protocol.

45. The method of claim 39, wherein the hopping sequence used by the first radio is time synchronized with the hopping sequence used by the second radio.

46. The method of claim 39, further comprising adjusting the spatial processing parameters used for transmitting signals from the second radio when a frequency resource for use at a specific time as determined by the first hopping sequence does not coincide with a frequency resource for use at the same specific time as determined by the second hopping sequence.

47. The method of claim 46, wherein adjusting comprises eliminating spatial processing parameters based on radio communications of the first radio.

48. The method of claim 39, further comprising synchronizing the timing applied to the first and second hopping sequences.

49. The method of claim 48, wherein synchronizing the timing comprises receiving a common satellite timing signal at the first radio and at the second radio and applying the timing signal to the hopping sequences.

50. The method of claim 39, wherein the second hopping sequence is coordinated with the first hopping sequence in that the first hopping sequence is stored in a memory of the second base station, the method further comprising comparing the first and second hopping sequences to select spatial processing parameters.

51. A machine-readable medium having stored thereon data representing instructions, which if executed by the machine, cause the machine to perform operations comprising:
transmitting signals from a first radio using a first hopping sequence; and
transmitting signals from a second radio using spatial processing and a second hopping sequence, the second hopping sequence being coordinated with the first hopping sequence.

52. The medium of claim 51, wherein the first hopping sequence is the same as the second hopping sequence through at least 3 consecutive hops.

53. The medium of claim 51, wherein the first hopping sequence is the same as the second hopping sequence.

54. The medium of claim 51, wherein the first and second radios comprise first and second base stations in a wireless communications network, at least a portion of the signals transmitted from the first base station interfering with at least a portion of the signals transmitted from the second base station.

55. The medium of claim 51, further comprising instructions, which if executed by the machine, cause the machine to perform further operations comprising synchronizing the timing of the hopping sequence used by the first radio with the hopping sequence used by the second radio.

56. The medium of claim 51, further comprising instructions, which if executed by the machine, cause the machine to perform further operations comprising adjusting the spatial processing parameters used for transmitting signals from the second radio when a frequency resource for use at a specific time as determined by the first hopping sequence does not coincide with a frequency resource for use at the same specific time as determined by the second hopping sequence.

57. The method of claim 56, wherein adjusting comprises eliminating spatial processing parameters based on radio communications of the first radio.

58. The method of claim 51, further comprising synchronizing the timing applied to the first and second hopping sequences.

59. The method of claim 58, wherein synchronizing the timing comprises receiving a common satellite timing signal at the first radio and at the second radio and applying the timing signal to the hopping sequences.

60. The method of claim 51, wherein the second hopping sequence is coordinated with the first hopping sequence in that the first hopping sequence is stored in a memory of the second base station, the method further comprising comparing the first and second hopping sequences to select spatial processing parameters.

61. An apparatus comprising:
a first radio having a first transmitter to transmit signals using a first hopping sequence; and
a second radio having a second transmitter to transmit signals using spatial processing and a second hopping sequence, the second hopping sequence being coordinated with the first hopping sequence.

62. The apparatus of claim 61, wherein the first hopping sequence is the same as the second hopping sequence through at least 3 consecutive hops.

63. The apparatus of claim 61, wherein the first hopping sequence is the same as the second hopping sequence.

64. The apparatus of claim 61, wherein the first and second radios comprise first and second base stations in a wireless communications network, at least a portion of the signals transmitted from the first base station interfering with at least a portion of the signals transmitted from the second base station.

65. The apparatus of claim 64, wherein the wireless communications network is a cellular network and wherein the first and second base stations are in adjacent cells.

66. The apparatus of claim 61, wherein the transmitted signals conform to an air interface protocol selected from the group consisting of a GSM protocol, a CDMA protocol, a digital cellular protocol, a WLL protocol, and a PHS protocol.

67. The apparatus of claim 61, wherein the second radio comprises a synchronization subsystem to synchronize the timing of the hopping sequence used by the second radio with the hopping sequence used by the first radio.

68. The apparatus of claim 67, wherein the synchronization subsystem comprises a satellite receiver to receive a common satellite timing signal at the second radio and apply the timing signal to the hopping sequences.

69. The apparatus of claim 61, wherein the second radio further comprises a memory to store the first hopping sequence and the second hopping sequence and a processor to compare the first and second hopping sequences to select spatial processing parameters.

* * * * *